US009282152B2

(12) United States Patent
Lee

(10) Patent No.: US 9,282,152 B2
(45) Date of Patent: *Mar. 8, 2016

(54) PROVIDING PUSH TO ALL (PTA) SERVICE

(71) Applicant: Samsung Electronics Co., Ltd., Suwon-si (KR)

(72) Inventor: Jin-Suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,313

(22) Filed: Nov. 17, 2014

(65) Prior Publication Data

US 2015/0074284 A1    Mar. 12, 2015

Related U.S. Application Data

(63) Continuation of application No. 11/581,391, filed on Oct. 17, 2006, now Pat. No. 8,909,789.

(30) Foreign Application Priority Data

Feb. 13, 2006   (KR) .................. 10-2006-0013895

(51) Int. Cl.
*G06F 15/16* (2006.01)
*H04L 29/08* (2006.01)
(Continued)

(52) U.S. Cl.
CPC .......... *H04L 67/141* (2013.01); *H04L 65/1006* (2013.01); *H04L 65/4061* (2013.01); *H04L 65/80* (2013.01); *H04L 67/142* (2013.01);
(Continued)

(58) Field of Classification Search
CPC . H04L 67/141; H04L 67/142; H04L 65/1006; H04L 65/4061; H04L 65/80; H04L 65/1016; H04W 4/10; H04W 76/005; H04W 84/08
USPC .......................... 709/204, 230, 220, 227, 228
See application file for complete search history.

(56) References Cited

U.S. PATENT DOCUMENTS 6,405,254 B1   6/2002  Hadland
6,714,987 B1   3/2004  Amin et al.
(Continued)

FOREIGN PATENT DOCUMENTS

DE    102004005720    8/2005
WO    2005043944      5/2005

OTHER PUBLICATIONS

Open Mobile Alliance (OMA): Push To Talk Over Cellular (PoC)-Architecture, Draft Version 2.0-30, Jan. 27, 2006.
(Continued)

*Primary Examiner* — Michael Y Won
(74) *Attorney, Agent, or Firm* — H.C. Park & Associates, PLC

(57) ABSTRACT

A system and method of providing a Push To All (PTA) service enables a PTA service terminal having limited resources to efficiently perform a multi session, while performing a PTA service such as Push To Talk (PTT), Push To Video (PTV) or Message Session Relay Protocol (MSRP) with a second PTA terminal via an already established session, by rejecting another session requested by a third terminal upon a service type of the session being the same as a service type of the already established session, and by accepting the session upon the service type of the session being different from the already established session.

11 Claims, 6 Drawing Sheets

(51) Int. Cl.
*H04W 4/10* (2009.01)
*H04W 76/00* (2009.01)
*H04W 84/08* (2009.01)
*H04L 29/06* (2006.01)

(52) U.S. Cl.
CPC .............. *H04W4/10* (2013.01); *H04W 76/005* (2013.01); *H04W 84/08* (2013.01); *H04L 65/1016* (2013.01)

(56) References Cited

U.S. PATENT DOCUMENTS

| | | | |
|---|---|---|---|
| 7,062,253 | B2 | 6/2006 | Money et al. |
| 7,177,641 | B1 | 2/2007 | Miernik et al. |
| 7,191,233 | B2 | 3/2007 | Miller |
| 7,213,054 | B2 | 5/2007 | Evans et al. |
| 7,277,945 | B1 | 10/2007 | Shah et al. |
| 7,340,523 | B2 | 3/2008 | Van Dyke et al. |
| 7,359,726 | B2 | 4/2008 | Choksi |
| 7,593,359 | B2 | 9/2009 | Eneroth et al. |
| 7,657,632 | B2 | 2/2010 | Nakao et al. |
| 7,676,582 | B2 | 3/2010 | Schmieder |
| 7,716,337 | B2 | 5/2010 | Yamakawa et al. |
| 7,738,442 | B2 | 6/2010 | Miyamoto et al. |
| 7,774,011 | B2 | 8/2010 | Sung et al. |
| 7,783,735 | B1 | 8/2010 | Sebes et al. |
| 7,886,063 | B2 | 2/2011 | Huh et al. |
| 7,900,140 | B2 | 3/2011 | Mohammed et al. |
| 7,979,564 | B2 | 7/2011 | Breau et al. |
| 8,023,979 | B2 | 9/2011 | Sung et al. |
| 8,036,189 | B2 | 10/2011 | Hirano et al. |
| 8,117,318 | B2 | 2/2012 | Odakura |
| 8,135,845 | B2 | 3/2012 | Lee et al. |
| 8,150,437 | B2 | 4/2012 | Choksi |
| 8,180,722 | B2 | 5/2012 | John et al. |
| 8,417,786 | B2 | 4/2013 | Colbert et al. |
| 8,578,076 | B2 | 11/2013 | Van Der Linden et al. |
| 8,606,899 | B1 | 12/2013 | Ryner et al. |
| 8,799,373 | B2 * | 8/2014 | Bian et al. ................ 709/206 |
| 2002/0036982 | A1 | 3/2002 | Chen |
| 2003/0055977 | A1 | 3/2003 | Miller |
| 2003/0133558 | A1 * | 7/2003 | Kung et al. ............. 379/215.01 |
| 2003/0177245 | A1 | 9/2003 | Hansen |
| 2004/0028081 | A1 * | 2/2004 | Chang et al. .................. 370/490 |
| 2004/0120474 | A1 | 6/2004 | Lopponen et al. |
| 2005/0135428 | A1 | 6/2005 | Hellgren |
| 2005/0213580 | A1 | 9/2005 | Mayer et al. |
| 2005/0243754 | A1 | 11/2005 | Saeed et al. |
| 2006/0087982 | A1 * | 4/2006 | Kuure et al. .................. 370/252 |
| 2006/0120344 | A1 * | 6/2006 | Yamaguchi et al. .......... 370/351 |
| 2006/0195593 | A1 | 8/2006 | Shiraki et al. |
| 2006/0211450 | A1 | 9/2006 | Niekerk et al. |
| 2006/0234745 | A1 | 10/2006 | Park et al. |
| 2006/0248180 | A1 | 11/2006 | Bernardi et al. |
| 2006/0293073 | A1 | 12/2006 | Rengaraju et al. |
| 2007/0022200 | A1 | 1/2007 | Benkert et al. |
| 2007/0027993 | A1 | 2/2007 | Schwagmann et al. |
| 2007/0076660 | A1 * | 4/2007 | Sung et al. .................... 370/329 |
| 2007/0094337 | A1 | 4/2007 | Klassen et al. |
| 2007/0100908 | A1 | 5/2007 | Jain et al. |
| 2007/0200915 | A1 | 8/2007 | Lee |
| 2008/0049741 | A1 | 2/2008 | Wirtanen et al. |
| 2008/0259909 | A1 * | 10/2008 | Runeson et al. .............. 370/352 |
| 2009/0279455 | A1 | 11/2009 | Wang et al. |
| 2010/0146066 | A1 * | 6/2010 | Bian et al. ..................... 709/206 |
| 2010/0246535 | A1 | 9/2010 | Lindner |
| 2010/0279728 | A1 * | 11/2010 | Rossotto et al. .............. 455/518 |
| 2011/0270956 | A1 * | 11/2011 | McDysan et al. ............. 709/220 |
| 2012/0069131 | A1 * | 3/2012 | Abelow ....................... 348/14.01 |

OTHER PUBLICATIONS

Schulke, et al., ESS Handling Concept, Open Mobile Alliance (OMA) POC V2 Documents, Jan. 25, 2006.
European Search Report dated Jan. 10, 2007, in European Patent Application No. 06023242.8.
Final Office Action dated Apr. 7, 2014, in U.S. Appl. No. 11/581,391.
Final Office Action dated Mar. 25, 2009, in U.S. Appl. No. 11/581,391.
Final Office Action dated May 24, 2010, in U.S. Appl. No. 11/581,391.
Non-Final Office Action dated Sep. 30, 2008, in U.S. Appl. No. 11/581,391.
Non-Final Office Action dated Sep. 15, 2009, in U.S. Appl. No. 11/581,391.
Non-Final Office Action dated Jan. 22, 2014, in U.S. Appl. No. 11/581,391.
Notice of Allowance dated Aug. 7, 2013, in U.S. Appl. No. 11/581,391.

* cited by examiner

FIG. 2

```
INVITE sip:adhoc@imstesta1.com SIP/2.0
From: <sip:solomon2@imstesta1.com>;tag=2b6230-7b0a10ac-13c4-4a1-33b523c0-4a1
To: <sip:adhoc@imstesta1.com>
Call-ID: 2cd468-7b0a10ac-13c4-4a1-3f82fcfb-4a1@imstesta1.com
CSeq: 1 INVITE
Via: SIP/2.0/UDP 172.16.10.123:5060;branch=z9hG4bK-4a1-1215e0-5d4b1f49
Accept-Contact: *;+g.poc.talkburst;require;explicit
Route: <sip:165.213.107.14:5080;lr>
Mime-Version: 1.0
Max-Forwards: 70
Supported: timer
P-Preferred-Identity: <sip:solomon2@imstesta1.com>
User-Agent: PoC-clinet/OMA1.0
Contact: <sip:172.16.10.123:5060>
Session-Expires: 1800
Content-Type: multipart/mixed;boundary=++
Content-Length: 692

--++
Content-Type: application/sdp
Content-Length: 310 v=0
o=- 0 0 IN IP4 172.16.10.123
s=-
c=IN IP4 172.16.10.123
t=0 0
a<m=audio>49648 RTP/AVP 0 8
   a=rtpmap:0 PCMU/8000
   a=rtpmap:8 PCMA/8000
   a=sendrecv
b<m=video>49650 RTP/AVP 34 31
   a=rtpmap:34 H263/90000
   a=rtpmap:31 H261/90000
   m=application 49651 udp TBCP
   a=fmtp:TBCP tb_priority=3;timestamp=1;queuing=1

--++
Content-Type: application/resource-lists+xml
Content-Length: 237

<?xml version="1.0" encoding="UTF-8"?>
<resource-lists xmlns="urn:ietf:params:xml:ns:resource-lists"
xmlns:xsi="http://www.w3.org/2001/XMLSchema-instance">
<list>
<entry uri="sip:solomon1@imstesta1.com"/>
</list>
</resource-lists>

```
INVITE sip:172.16.10.123:5060 SIP/2.0
From: anonymous <sip:anonymous@anonymous.invalid>;tag=20-12-2-IMN1
To: <sip:solomon2@imstestal.com>
Call-ID: 142601203-ri-20-12-2IMN1
CSeq: 8388 INVITE
Via: SIP/2.0/UDP 165.213.107.14:5080;branch=z9hG4bK15dd_1.2.2.16.21774.2.
Via: SIP/2.0/UDP 165.213.107.14:5070;branch=z9hG4bK15dc_2.0.2.16.21773.6.
Via: SIP/2.0/UDP 165.213.107.14:5070;branch=z9hG4bK15db_2.0.1.16.21773.5.
Via: SIP/2.0/UDP 172.16.10.112:5070;branch=z9hG4bK-proxyModeres1659801429
Via: SIP/2.0/UDP 165.213.107.14:5070;branch=z9hG4bK15da_2.0.1.16.21773.2.
Via: SIP/2.0/UDP 165.213.107.14:5070;branch=z9hG4bK15d9_2.1.2.16.21772.6.
Via: SIP/2.0/UDP 165.213.107.14:5070;branch=z9hG4bK15d8_2.0.1.16.21772.5.
Via: SIP/2.0/UDP 172.16.10.112:5070;branch=z9hG4bK-ri-20-12-2-297333756
Contact: <sip:12.1.1853806020@172.16.10.112:5070>
Supported: timer
Max-Forwards: 66
P-Called-Party-ID: <sip:solomon2@imstestal.com:5060>
User-Agent: IM-serv
Accept-Contact: *;+g.im.conference=TRUE
Referred-By: <sip:solomon3@imstestal.com>
Record-Route: <sip:1.2.2.16.21774.2.@165.213.107.14:5080;lr>
Record-Route: <sip:1.2.2.16.21774.0.@165.213.107.14:5080;lr>
Record-Route: <sip:2.0.2.16.21773.6.@165.213.107.14:5070;lr>
Record-Route: <sip:2.0.1.16.21773.5.@165.213.107.14:5070;lr>
Record-Route: <sip:2.0.1.16.21773.2.@165.213.107.14:5070;lr>
Record-Route: <sip:2.0.2.16.21773.0.@165.213.107.14:5070;lr>
Record-Route: <sip:2.1.2.16.21772.6.@165.213.107.14:5070;lr>
Record-Route: <sip:2.0.1.16.21772.5.@165.213.107.14:5070;lr>
Session-Expires: 90;refresher=uas
Content-Type: application/sdp
Content-Length: 180 v=0
o=- 0 0 IN IP4 172.16.10.112
s=-
c=IN IP4 172.16.10.112
t=0 0
C< m=message>9999 msrp/tcp *
a=accept-types:text/plain
a=path:msrps://172.16.10.114:19200/ims-11-0-2-ims;tcp
```

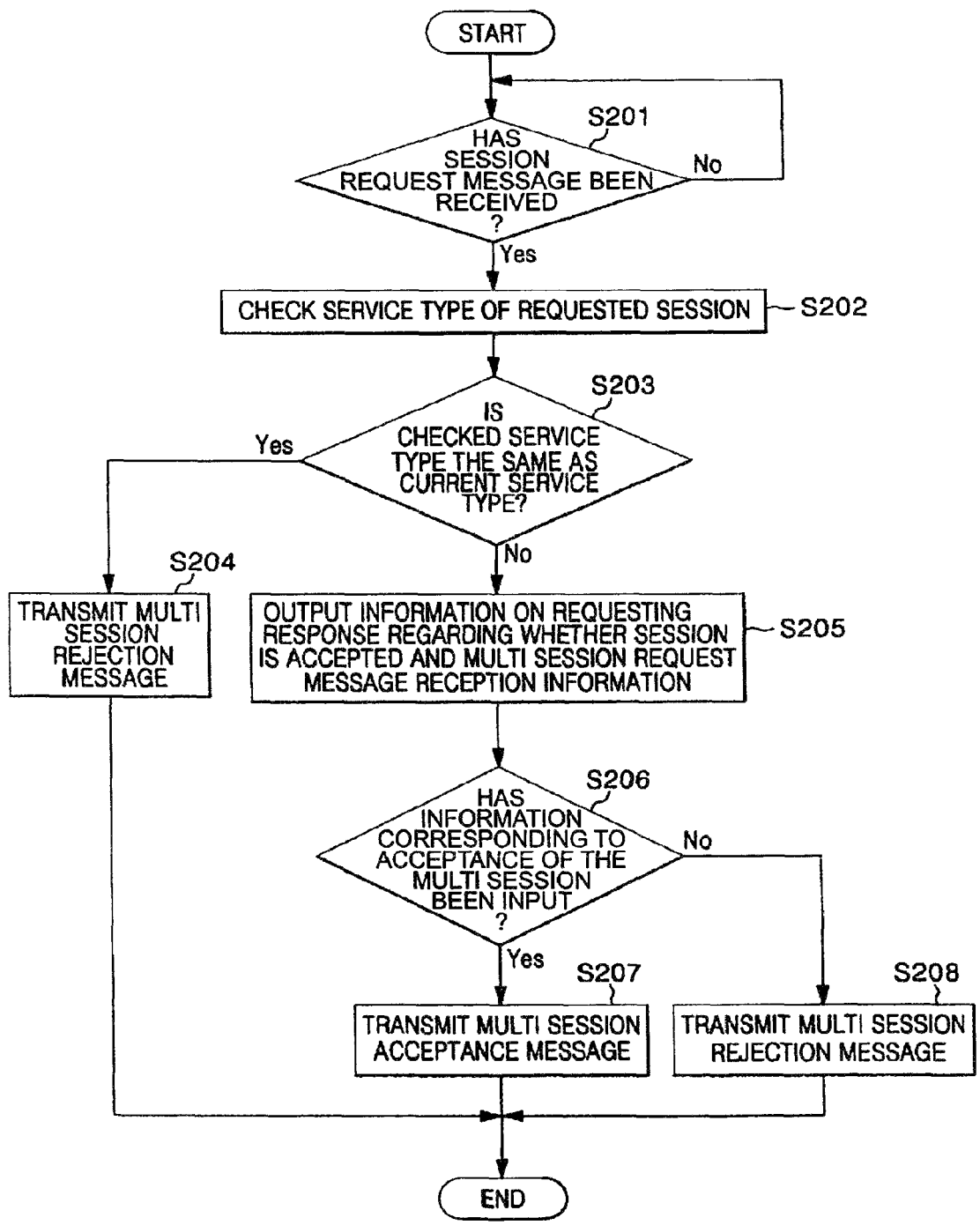

PROVIDING PUSH TO ALL (PTA) SERVICE

CROSS REFERENCE TO RELATED APPLICATIONS

This application is a continuation of U.S. patent application Ser. No. 11/581,391, filed on Oct. 17, 2006, and claims the benefit of and priority from Korean Patent Application No. 10-2006-0013895, filed Feb. 13, 2006, each of which is incorporated by reference for all purpose as if fully set forth herein.

BACKGROUND

1. Field

The present invention relates to a system and method of providing a Push To All (PTA) service.

2. Discussion

A Push To All (PTA) service based on an IP-based Multimedia Subsystem (IMS) includes a Push To Talk (PTT) service providing only a voice service, a Push To Video (PTV) service providing voice and image services, and a Message Session Relay Protocol (MSRP) service providing Short Message Service (SMS) or binary data service.

The PTA is based on Session Initiation Protocol (SIP), which is a text-based application level protocol, and SIP is adopted by many systems due to its simple structure and excellent extendibility compared to other protocols. Literally, the SIP is a signaling protocol used to connect a session. The SIP can be used in a video telephone call, multimedia, connecting to an online game, etc., in addition to an Internet telephone call. RFC 2543 is a first version of an RFC that was adopted as a standard, and has been updated to RFC 3261.

When a PTA service subscriber wants to communicate with a counterpart, the subscriber selects the counterpart to invite, generates an invitation message in SIP format, and transmits the message to a server by selecting a call button or a service start button on a PTA terminal. According to this process, a session is created by the server, and the PTA subscriber participates in a PTA session such as PTT, PTV, MSRP, etc.

When another subscriber out of the PTA session requests a called subscriber, whose line is busy due to participation in the PTA session, to accept another PTA session, the server informs the called subscriber of this request, and then receives a response indicating an intention to participate in the other PTA session, thereby enabling the called subscriber to participate in two PTA talk sessions simultaneously. In other word, the PTA service provides a multi session.

The PTA service allows each PTA terminal subscriber to be provided with the multi-session after each PTA terminal subscriber registers information in advance as to whether to accept the multi session with the server.

The PTA service allows "Call-Lag" multiple management to be performed by the SIP used by the PTA service to provide the multi session.

Consequently, terminals such as mobiles, PDAs, etc., providing the PTA service perform "Call-Lag" multiple management and have limited resources left over to provide the multi session.

SUMMARY

It is an object of the present invention to provide a system and method of providing a Push To All (PTA) service, capable of providing various multi services using a terminal having limited resources in the PTA service.

According to one aspect of the present invention, a system providing a Push To All (PTA) service is provided, the system including: at least one terminal and another terminal, the at least one terminal adapted to transmit a session rejection message to another terminal upon a service type of a session request message received from the another terminal being the same as a service type of an established first session, and to establish a second session with the another terminal upon the service type of the received session request message being different from the service type of the first session.

The service type of the first session is preferably either a Push To Talk (PTT) service or a Push To Video (PTV) service. The service type of the second session is preferably a Message Session Relay Protocol (MSRP) service.

The session request message preferably includes at least one PTA service type of Push To Talk (PTT), Push To Video (PTV) or Message Session Relay Protocol (MSRP) to establish a session with the at least one terminal.

The at least one terminal is preferably adapted to output session request message reception information and information on requesting a response indicating whether the session is accepted to a user upon the service type of the session request message received from the another terminal is different from the service type of the first session, and to establish the second session by receiving information on accepting the session from the user and transmitting a session acceptance message to the another terminal. The at least one terminal is preferably adapted to transmit a session rejection message to the another terminal not to establish the second session upon session rejection information being input by the user.

The at least one terminal preferably includes: a transceiver adapted to transmit and receive PTA service messages to and from the another terminal; and a controller adapted to facilitate the session rejection message being provided to the another terminal upon the service type of the session request message received by the transceiver being the same as the service type of the first session, and to facilitate the session acceptance message being provided to the another terminal to establish the second session with the another terminal upon the service type of the received message being different from the service type of the first session.

According to another aspect of the present invention, a terminal providing a Push To All (PTA) service is provided, the terminal including: a transceiver adapted to transmit and receive PTA service messages to and from another terminal; and a controller adapted to facilitate a session rejection message being provided to the another terminal upon a service type of a session request message received by the transceiver being the same as a service type of an established session, and to facilitate establishing another session with the another terminal using a service type of the session request message upon the service type of the message received being different from the service type of the established session.

According to still another aspect of the present invention, a method of providing a Push To All (PTA) service to at least one terminal is provided, the method including: receiving a session request message at a terminal with which a first session has been established, the session request message being from another terminal with which the first session has not been established; comparing a service type of the received session request message with a service type of the first session at the terminal; the terminal transmitting a session rejection message to the another terminal upon the service type of the received session request message being the same as the service type of the first session; and the terminal establishing a second session with the another terminal upon the service type of the received session request message being different from the service type of the first session.

The type of service of the first session is preferably either a Push To Talk (PTT) service or a Push To Video (PTV) service. The type of service of the second session is preferably a Message Session Relay Protocol (MSRP) service.

The session request message preferably includes at least one PTA service type of Push To Talk (PTT), Push To Video (PTV) or Message Session Relay Protocol (MSRP) to establish a session with the terminal.

The terminal establishing the second session with the another terminal preferably includes: the terminal outputting session request message reception information and information on requesting a response indicating whether the session has accepted to a user upon the service type of the received session request message being different from the service type of the first session; transmitting a session acceptance message to the another terminal upon information on accepting the session being input by the user; and transmitting a session rejection message to the another terminal upon information on rejecting the session being input by the user.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein:

FIGS. 2 and 3 are Session Initiation Protocol (SIP) "INVITE" messages according to an exemplary embodiment of the present invention;

FIG. 6 is a flowchart of a method of providing a PTA service according to an exemplary embodiment of the present invention.

DETAILED DESCRIPTION OF THE ILLUSTRATED EMBODIMENTS

Hereinafter, exemplary embodiments of the present invention are described in detail with reference to the accompanying drawings. It will be understood by those skilled in the art that various modifications in form and detail can be made to the following exemplary embodiments without departing from the spirit and scope of the present invention as defined by the appended claims.

Figure 1:
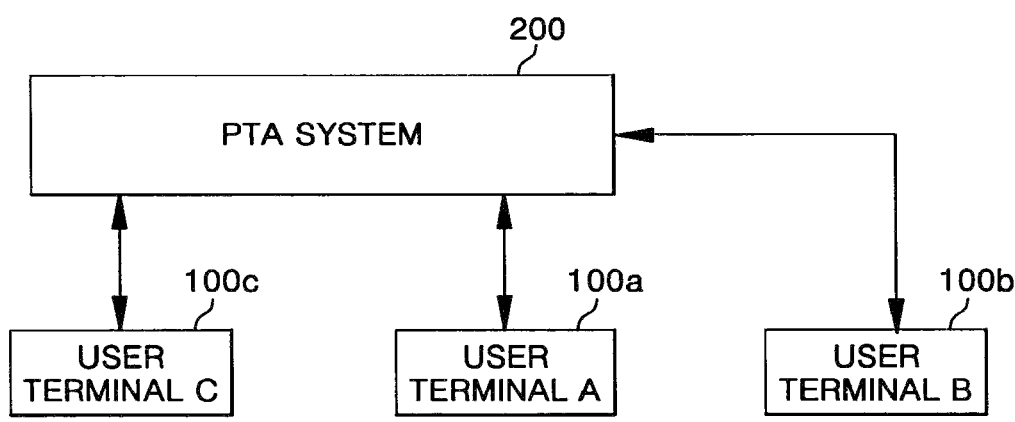
FIG. 1 is a view of a multi session service system in a Push To All (PTA) system according to an exemplary embodiment of the present invention.

FIG. 1 is a view of a multi session service system in a Push To All (PTA) system according to an exemplary embodiment of the present invention.

As illustrated in FIG. 1, a system for providing a PTA service according to an exemplary embodiment of the present invention comprises a PTA system 200 and a plurality of user terminals 100*a*, 100*b*, and 100*c*.

The user terminals 100*a*, 100*b*, and 100*c* are PTA terminals connected to the PTA system 200 to perform a Push To Talk (PTT) service, a Push To Video (PTV) service, and a Message Session Relay Protocol (MSRP) service. In particular, the user terminals 100*a*, 100*b*, and 100*c* support establishment of a multi session by a user through user interfaces.

Among the user terminals 100*a*, 100*b*, and 100*c*, a user terminal A 100*a* (hereinafter referred to as a "first terminal") is a PTA terminal in the process of performing the PTT, PTV, or MSRP service with a user terminal B 100*b* (hereinafter referred to as a "second terminal") through a session which has already been created. The first terminal receives a session request message, i.e., an "INVITE" message, from a calling subscriber using a user terminal C 100*c* (hereinafter referred to as a "third terminal") through the PTA system 200.

The first terminal 100*a* parses a Session Description Protocol (SDP) included in the transmitted "INVITE" message to determine the type of PTA service session that the third terminal 100*c* has requested.

FIGS. 2 and 3 are Session Initiation Protocol (SIP) "INVITE" messages according to an exemplary embodiment of the present invention.

As illustrated in FIG. 2, a terminal can determine whether the type of service of a requested session is a PTT service or a PTV service through "m=audio" recorded in a of the SDP in the SIP "INVITE" message or "m=video" recorded in b.

Also, as illustrated in FIG. 3, a terminal can determine whether the type of service of a requested session is an MSRP service through "m=message" recorded in c of the SDP in the SIP "INVITE" message.

Comparing the checked PTA service type with the PTA service type currently being provided, when the service types are the same, the first terminal 100*a* transmits a message rejecting a requested PTA service session to the PTA system 200 so that the message rejecting the requested PTA service session is provided to the third terminal 100*c*. The PTA service can authorize the PTT service and the PTV service as the same service.

However, when the checked PTA service type is different from that currently being provided, the first terminal 100*a* informs a called subscriber, i.e., a user, that a session request has been received, and allows the user to determine whether to accept a multi session.

When the user accepts the multi session, the first terminal 100*a* transmits a multi session acceptance message to the PTA system so that a new session can be created according to a request of the third terminal 100*c*.

For example, when the first terminal 100*a* is in the process of performing the PTT service with the second terminal 100*b* through a session which has already been created, and receives a request for an MSRP service session from a calling subscriber, i.e., the third terminal 100*c*, the PTA service system allows the called subscriber, i.e., the user, to determine whether to accept the session, and then generates the session according to the user's decision.

However, the first terminal 100*a* transmits the session rejection message to the PTA system 200 so as not to generate a session with the third terminal 100*c* when the PTT or PTV service session has been requested by the calling subscriber, i.e., the third terminal 100*c*.

Figure 4:
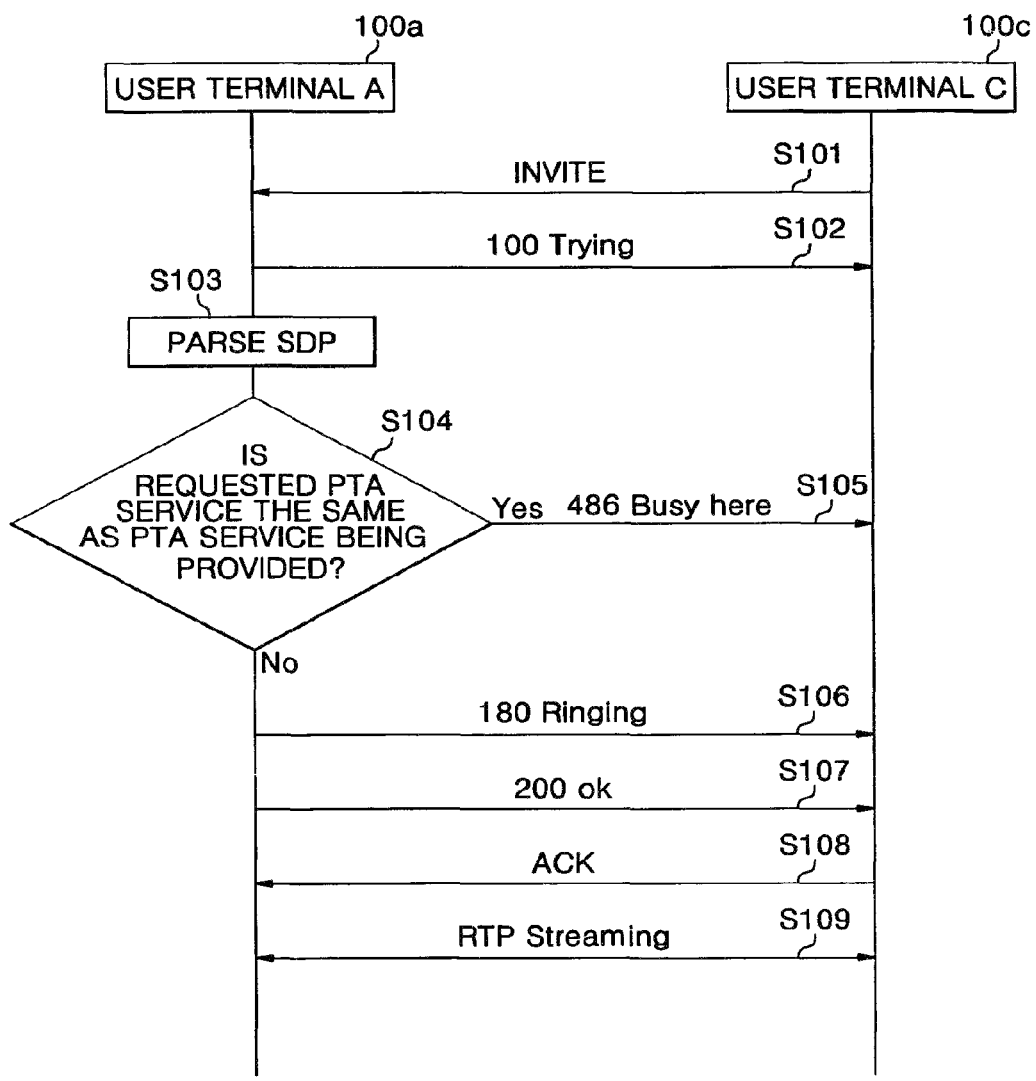
FIG. 4 is a view of a method of providing a PTA service according to an exemplary embodiment of the present invention.

FIG. 4 is a view of a method of providing a PTA service according to an exemplary embodiment of the present invention.

As illustrated in FIG. 4, when a first terminal 100*a* is in the process of performing a PTT, PTV or MSRP service with a second terminal 100*b* through an already created session, the first terminal 100*a* may receive a session request message, i.e., an "INVITE" message, from a third terminal 100*c* through a PTA system 200 (not shown—a description of a function of the PTA system 200 acting as a relay has been omitted), in S101.

The first terminal 100*a* transmits a "100 Trying" message to the third terminal 100*c* when the "INVITE" message has been received from the third terminal 100*c*, in S102.

The first terminal 100*a* then parses the SDP included in the received "INVITE" message, and checks the PTA service session type requested by the third terminal, in S103.

Comparing the checked PTA service type with the PTA service type being provided, the first terminal 100*a* transmits a message to the third terminal 100*c* indicating that the requested PTA service session has been rejected when both PTA service types are identical, in S104.

For example, the first terminal 100*a* transmits a "486 Busy Here" message to the third terminal 100*c* to inform the third terminal 100*c* that a multi session has been rejected, in S105.

When the checked PTA service type is different from the PTA service type currently being provided, the first terminal 100*a* informs a called subscriber, i.e., a user, that a session request has been received, and transmits a "180 Ringing" message to the third terminal 100*c*, in S106.

After the first terminal 100*a* allows the user to determine whether to accept the multi session, it transmits a multi session acceptance message to the third terminal 100*c* when the user has accepted the multi session, in S107.

For example, the first terminal 100*a* transmits a "200 OK" message to the third terminal 100*c*, thereby informing the third terminal 100*c* that the multi session has been accepted.

After transmitting the multi session acceptance message, the first terminal 100*a* receives an ACK message corresponding to the multi session acceptance message from the third terminal 100*c*, in S108, and performs RTP streaming with the third terminal 100*c* through a created session, in S109.

Figure 5:
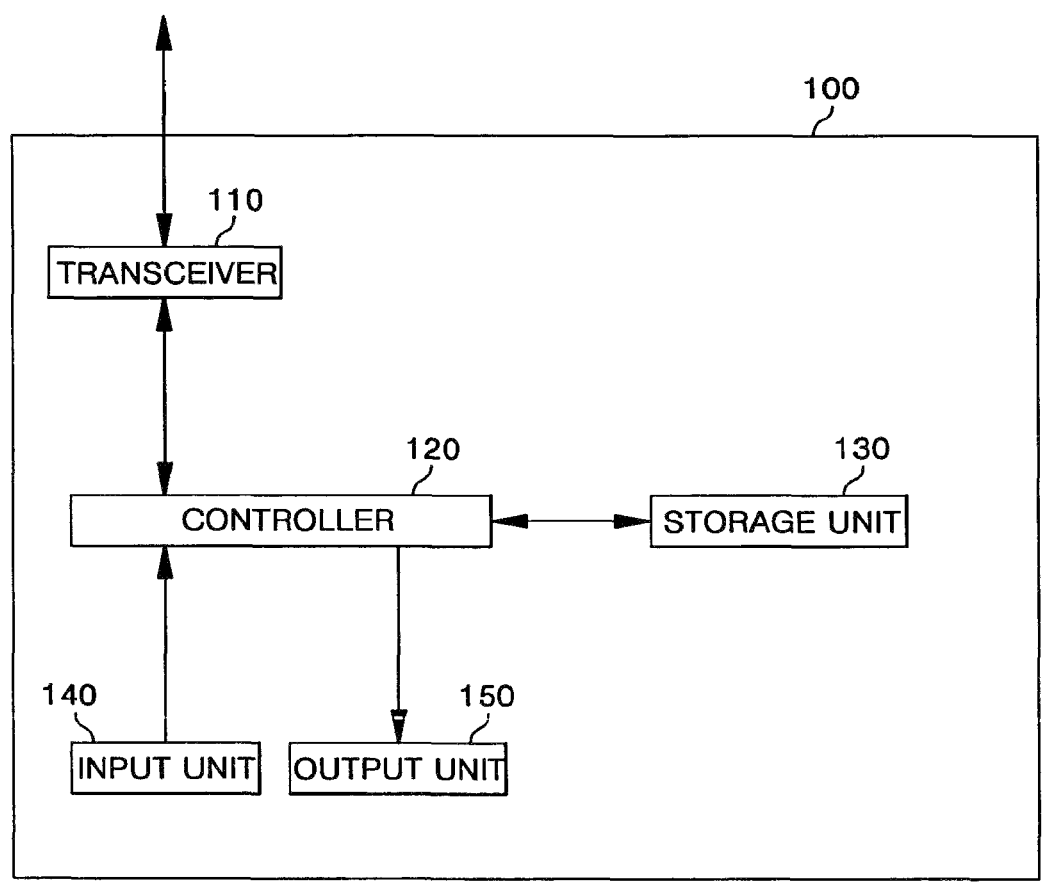
FIG. 5 is a block diagram of a terminal of a PTA subscriber according to an exemplary embodiment of the present invention.

FIG. 5 is a block diagram of a PTA user terminal according to an exemplary embodiment of the present invention.

As illustrated in FIG. 5, the PTA user terminal 100 includes a transceiver 110, a controller 120, a storage unit 130, an input unit 140, and an output unit 150.

The transceiver 110 transmits and receives a PTT, PTV or MSRP service message to/from a PTA system 200.

The controller 120 parses and processes the PTT, PTV or MSRP service message received through the transceiver 110, and controls all of the functions of the terminal.

The storage unit 130 stores information on a service type being provided to the terminal, and information on a received message.

The input unit 140 receives information from a user as to acceptance or rejection of a multi session.

The output unit 150 provides information on requesting a response as to whether to accept the multi session and multi session request message reception information to a user through a speaker or a display.

FIG. 6 is a flowchart of a method of providing a PTA service according to an exemplary embodiment of the present invention.

As illustrated in FIG. 6, a terminal 100*a* performing a PTT, PTV or MSRP service with a second terminal 100*b* through a session which has already been created, determines whether a session request message has been received from a third terminal 100*c*, in S201.

When the session request message has been received from the third terminal 100*c*, the terminal 100*a* parses the received message and checks a service type of a requested session, in S202.

The terminal 100*a* checks whether the parsed PTA service type is the same service type as a PTA service type currently being provided with the second terminal 100*b*, in S203.

When it is determined that the checked PTA service type is the same as the PTA service type currently being provided, the terminal 100*a* transmits a multi session rejection message to the third terminal 100*c*, in S204.

However, when it is determined that the checked PTA service type is different from the PTA service type currently being provided, the terminal 100*a* outputs information on requesting a response to whether to accept the multi session and the multi session request message reception information, and receives information corresponding to the output information from the user, in S205, S206.

The terminal 100*a* transmits a multi session acceptance message to the third terminal 100*c* when information corresponding to acceptance of the multi session has been input by the user, in S207, and transmits the multi session rejection message to the third terminal 100*c* when information corresponding to rejection of the multi session has been input by the user, in S208.

As described above, a system and method of providing a PTA service in accordance with the present invention enable a PTA service terminal having limited resources to efficiently perform a multi session by rejecting a session requested by a third terminal, while performing a PTA service such as PTT, PTV or MSRP with a second PTA terminal through a session in progress, when a service type of the session is the same as a service type of the session already in progress, and by accepting the session when the service type is different from the session already in progress.

While the present invention has been described with reference to exemplary embodiments thereof, it will be understood by those skilled in the art that various modifications in form and detail can be made therein without departing from the scope of the present invention as defined by the following claims.

What is claimed is:

1. A terminal, comprising:
a transceiver configured to receive, from a first terminal, a session invite request to establish a new session with the terminal;
a controller configured to:
determine whether a service type of the session invite request is similar to a service type of an established session between the terminal and a second terminal; and
control the transceiver to transmit, to the first terminal, a first session rejection response based on the determination,
wherein the session invite request is based on message session relay protocol (MSRP) or real-time transport protocol (RTP).

2. The terminal of claim 1, wherein the controller is configured to determine whether to reject the session invite request based on a declination received at the terminal.

3. The terminal of claim 2, wherein the transceiver is configured to transmit, to the first terminal, a second session rejection response based on the determination whether to reject the session invite request based on the declination.

4. The terminal of claim 1, wherein establishment of the new session is based on a determination that the service types are different and an acceptance received at the terminal.

5. The terminal claim 3, wherein:
the first session rejection response is a session initiation protocol (SIP) 486 "Busy Here" response; and the second session rejection response is a SIP 480 "Temporarily Unavailable" response.

6. The terminal of claim 1, wherein:
the service type is at least one of an audio, a message, and a video service; and
the service type is defined in a session description protocol (SDP) body.

7. A terminal, comprising:
a controller configured to generate a session invite request to establish a new session with a first terminal; and
a transceiver configured to:
   transmit the session invite request to the first terminal; and
   receive a first session rejection response from the first terminal, wherein:
     reception of the first session rejection response is in response to a service type of the session invite request being similar to a service type of an established session between the first terminal and a second terminal; and
     the session invite request is based on message session relay protocol (MSRP) or real-time transport protocol (RTP).

8. The terminal of claim 7, wherein the transceiver is configured to receive a second session rejection response from the first terminal in response to a declination received at the first terminal.

9. The terminal of claim 7, wherein establishment of the new session is based on a determination that the service types are different and an acceptance received at the first terminal.

10. The terminal claim 8, wherein:
the first session rejection response is a session initiation protocol (SIP) 486 "Busy Here" response; and
the second session rejection response is a SIP 480 "Temporarily Unavailable" response.

11. The terminal of claim 7, wherein:
the service type is at least one of an audio, a message, and a video service; and
the service type is defined in a session description protocol (SDP) body.

\* \* \* \* \*